June 21, 1949.   J. VERDERBER ET AL   2,474,131
LAWN MOWER
Filed Aug. 7, 1945   3 Sheets-Sheet 2

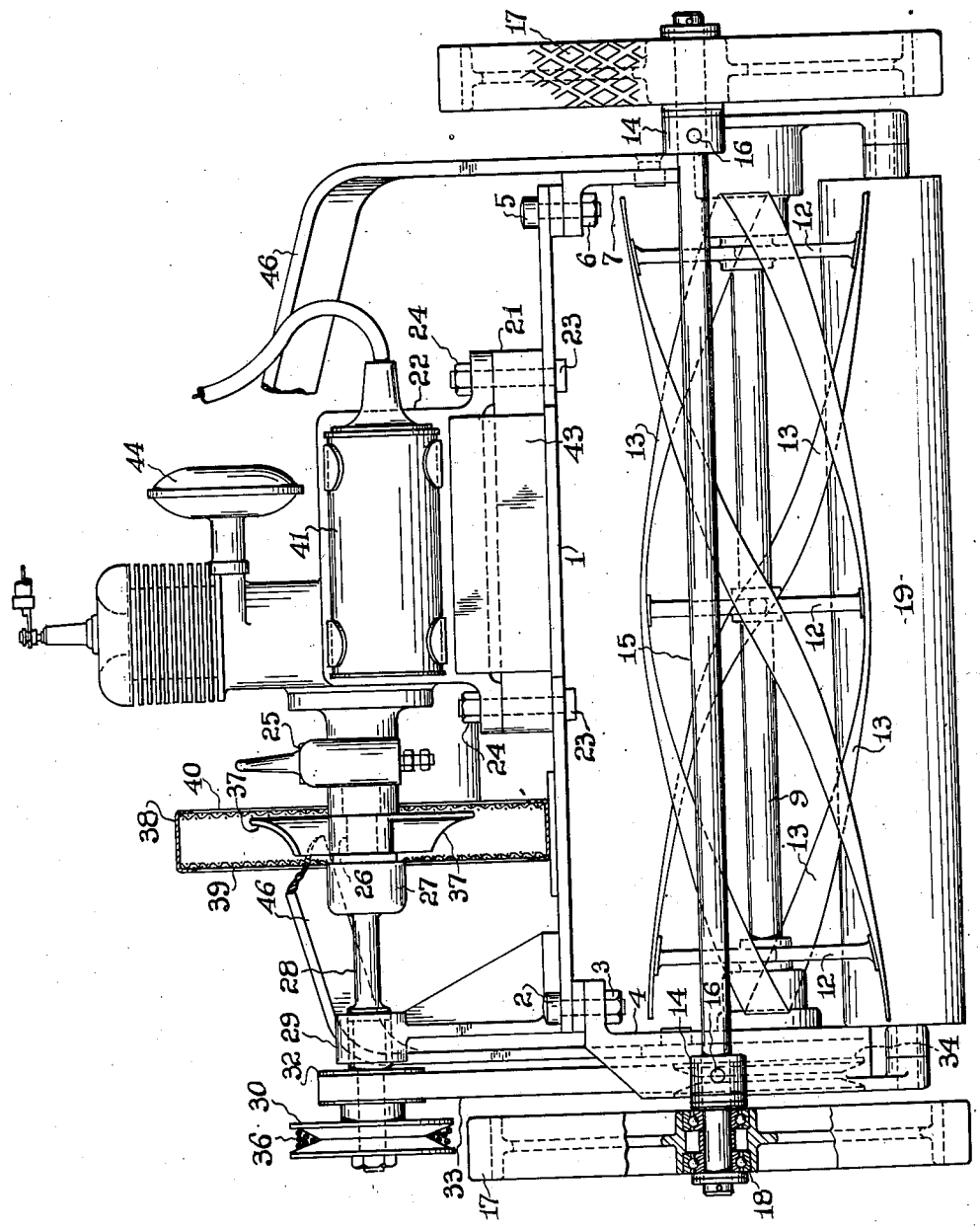

INVENTORS.
JOSEPH VERDERBER
BY RAYMOND H. LISKA

ATTORNEY.

June 21, 1949. J. VERDERBER ET AL 2,474,131
LAWN MOWER
Filed Aug. 7, 1945 3 Sheets-Sheet 3

INVENTORS.
JOSEPH VERDERBER
BY RAYMOND H. LISKA
William Isler
ATTORNEY

Patented June 21, 1949

2,474,131

UNITED STATES PATENT OFFICE 2,474,131

LAWN MOWER

Joseph Verderber and Raymond H. Liska,
Cleveland, Ohio

Application August 7, 1945, Serial No. 609,428

1 Claim. (Cl. 56—26)

This invention relates, as indicated, to lawn mowers, but has reference more particularly to lawn mowers of the power-operated or power-actuated type.

A primary object of the invention is to provide a lawn mower of the type described, which is of light weight construction and extremely maneuverable.

Another object of the invention is to provide a lawn mower of the type described in which the cutter blades are directly driven by power means, but in which the supporting wheels are not driven.

A further object of the invention is to provide a lawn mower of the type described having a driving engine and associated parts so disposed and arranged as to concentrate their weight above the supporting wheels, whereby to increase the maneuverability of the mower.

A still further object of the invention is to provide a lawn mower of the type described which consists of a minimum number of easily assembled and inexpensively manufactured parts.

Other objects and advantages of the invention will be apparent during the course of the following description.

In the accompanying drawings, forming a part of the specification, and in which like numerals are employed to designate like parts throughout the same, Fig. 1 is a front elevational view of a preferred form of a lawn mower, with portions broken away to more clearly show the construction thereof;

Figure 3:
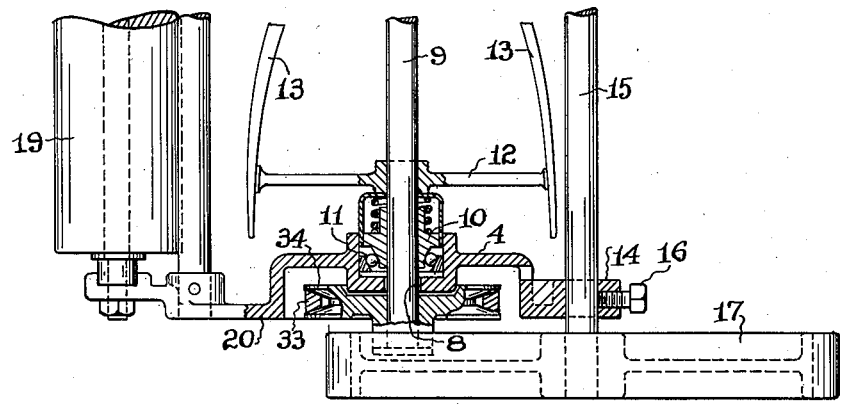
Fig. 3 is a fragmentary cross-sectional view, taken on the line 3—3 of Fig. 2.
Figure 2:
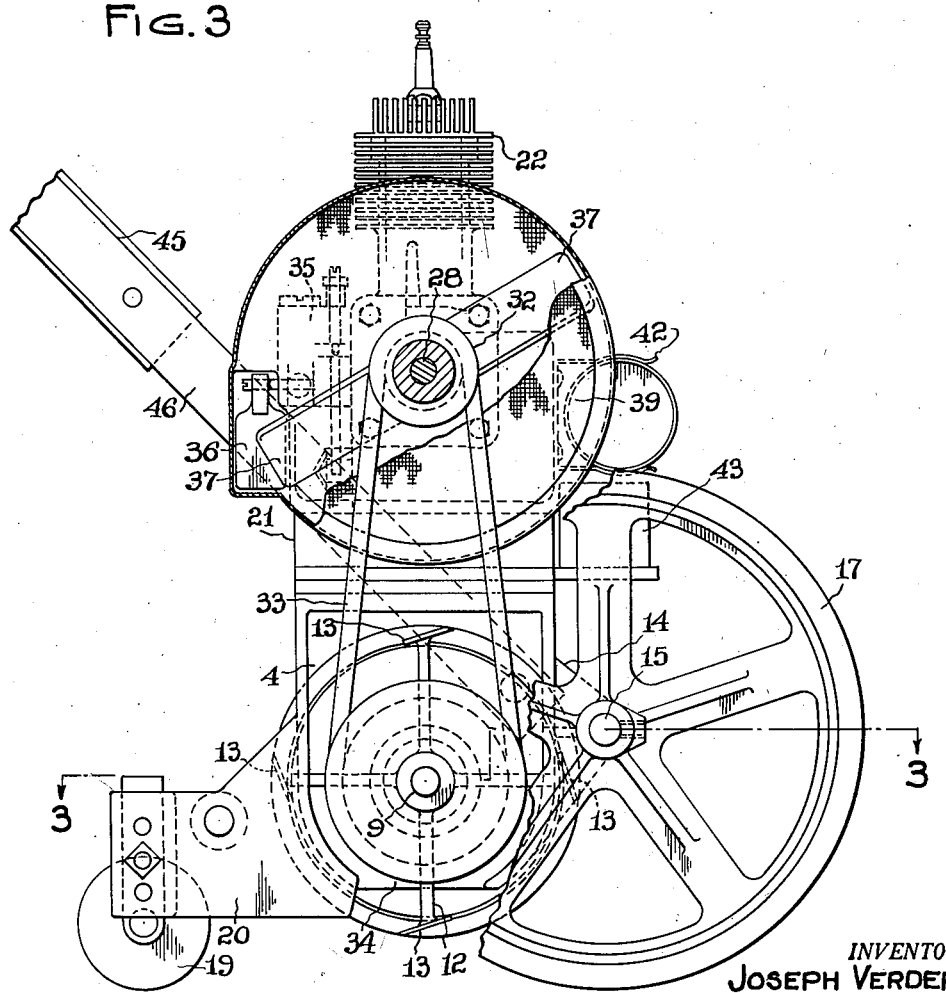
Fig. 2 is an elevation of the left end of the lawn mower (as viewed in Fig. 1), with portions broken away to show the cutter-blade drive.

Referring more particularly to Figs. 1 to 3 of the drawings, the lawn mower will be seen to comprise a shelf or bracket 1 having secured to one end thereof, as by means of bolts 2 and nuts 3, a member 4, and having secured to the other end thereof, as by means of bolts 5 and nuts 6, a member 7.

The members 4 and 7 have axially-aligned openings 8 through which the ends of a shaft 9 extend. The shaft 9 is rotatably mounted in self-aligning ballbearings 10, which are disposed within recesses 11 in the members 4 and 7, the shaft being further provided with longitudinally-spaced spiders 12, which support the cutter blades 13.

The blades 13 extend spirally about the shaft 9 in the conventional manner of lawn mower blades, but in this case, since the blades do not coact with a fixed blade, they are pitched at a very shallow angle relatively to the lawn surface so as to produce a scythe-like cutting action when rapidly rotated.

The members 4 and 7 are also provided with forwardly extending portions 14, in which a shaft or rod 15 is rigidly secured, as by means of set screws 16. Rubber-tired supporting wheels 17 are mounted on ball bearings 18, which are interposed between the hubs of these wheels and the ends of the shaft 15.

In order to support the blades 13 at a desired elevation above ground level, a roller 19 is provided, which is rotatably carried by rearward extensions 20 of the members 4 and 7, this roller coacting with the wheels 17 to support the blades at such elevation.

Mounted on the shelf or bracket 1 is a base plate 21, upon which an internal combustion engine 22 is mounted, the engine being secured to the base plate 21 and shelf 1 by means of bolts 23 and nuts 24. The engine 22 is provided with an ignition timer 25, and the shaft 26 of the engine is connected, through a coupling 27, to a stub shaft 28, which is journalled in a pedestal bearing 29, the latter being rigidly supported on the bracket 1.

The shaft 28 has secured to its outboard end a starting sheave 30, provided with a self-winding cable 31, whereby the engine may be manually started. A sheave 32 is mounted on the shaft 28, between the bearing 29 and sheave 30, and, through the intermediary of an endless V-belt 33, drives a sheave 34, which, as shown in Fig. 3, is keyed to or otherwise rigidly secured to one end of the shaft 9, the sheave 34 being disposed in a hollowed-out portion of the member 4.

The lawn mower further includes a carburetor 35, which is disposed rearwardly of the engine 32, and which is controlled by a speed governor 36, pivotally mounted on the carburetor. The shaft 26 is provided with a pair of blades 37 which function both as flywheel for the engine shaft and as a cooling fan for cooling the engine. The blades 37 are disposed within a guard comprising a casing 38 and spaced screens 39 and 40, the guard being mounted on the bracket 1.

An ignition coil 41 or other ignition-supplying means is supported by a spring clip holder 42 which is fastened to the front of the engine 22, and a battery 43 is supported upon a forward extension of the shelf 1 directly below the ignition coil. Reference numeral 44 designates the muffler of the engine 22.

The lawn mower is provided with the usual handle 45, the arms 46 of which are pivotally secured to the members 4 and 7.

The lawn mower, it will be noted, is not of the self-propelling type, but must be manually pushed. This has been found to be a distinct advantage in a power-operated lawn mower, since it eliminates the use of the complicated heavy gearing and gear reduction units which are usually associated with the supporting wheels of such a mower, the weight of the mower being thereby reduced to a point at which it may be easily manipulated, despite the added weight of the engine and associated parts.

The maneuverability of the mower is further increased by virtue of the fact that the engine and its supporting parts are disposed directly above the blade drive shaft, and the ignition coil and battery directly above the supporting wheel shaft.

In operation, the blades 13 will be driven by the engine at a relatively high speed, it being noted that the drive is a direct one, and that since no power is required to drive the wheels 17, the engine 22 may be of relatively light weight and of small power, its only function being to rotate the blades.

In order to avoid excessive and undesirable speeds, the governor 36 is so mounted in relation to the blades 37 that when a predetermined speed has been attained, the air pressure caused by the blades 37 is such as to move the governor 36 to a position in which it decreases the flow of fuel to the carburetor, thereby retarding the speed of the engine. This is a desirable safety feature.

Figure 5:
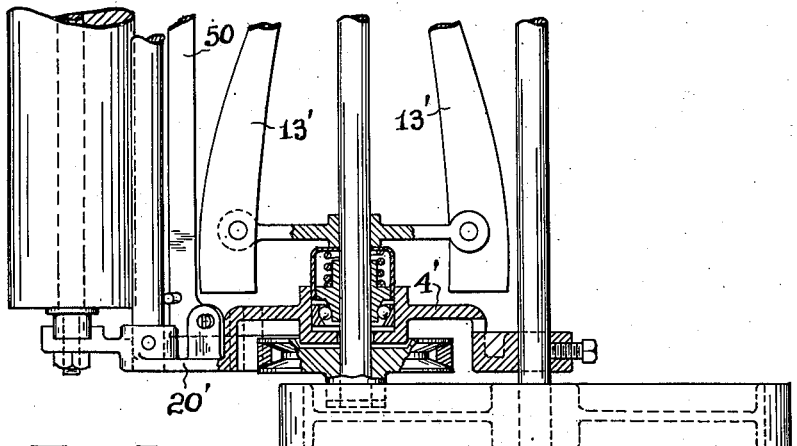
Fig. 5 is a fragmentary cross-sectional view, taken on the line 5—5 of Fig. 4.
Figure 4:
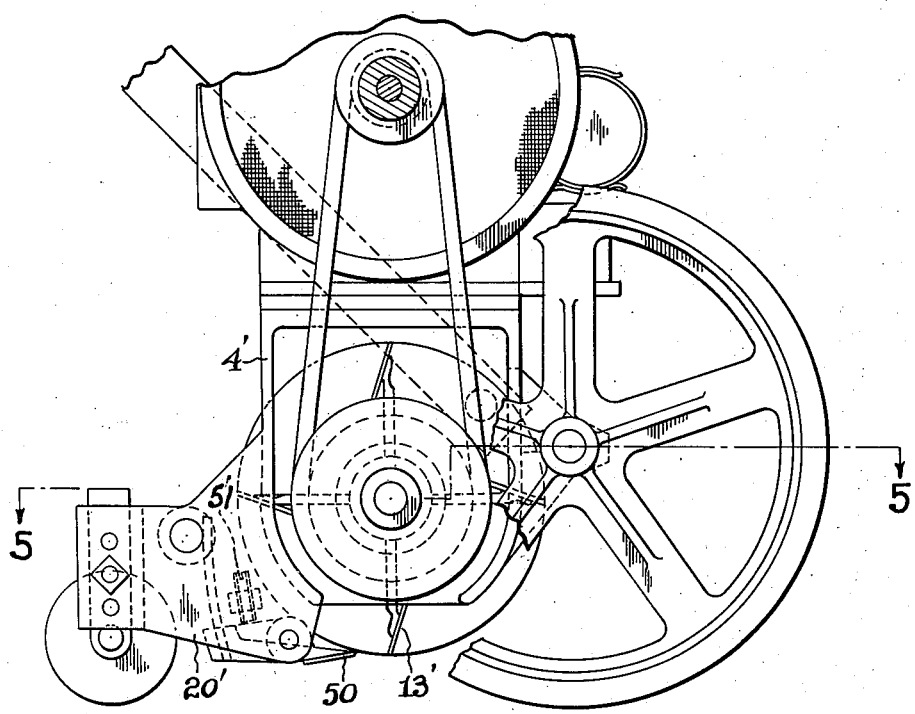
Fig. 4 is a view similar to Fig. 2, but of a somewhat modified form of the invention.

In the modified form of mower shown in Figs. 4 and 5, the construction is substantially the same as that of the previously described form of the invention, but in this case, the blades 13' are of the conventional type, designed to coact with a fixed blade 50, which is carried by the extensions 20 of the members 4 and 7. The fixed blade 50 may be adjusted by conventional screw adjusting means, indicated at 51.

It will be understood that means other than an internal combustion engine may be used to drive the mower.

It is to be understood that the forms of our invention, herewith shown and described, are to be taken as preferred examples of the same, and that various changes in the shape, size, and arrangement of parts may be resorted to, without departing from the spirit of our invention, or the scope of the subjoined claims:

Having thus described our invention, we claim:

In a power driven lawn mower of the character described, the combination of a roller bar, a shaft in parallel spaced relationship to said roller bar, supporting wheels rotatably mounted on the ends of said shaft, a second shaft in parallel spaced relationship to said roller bar and positioned between said roller bar and said first-named shaft, cutter blades mounted on said second shaft, a pair of frame members disposed on opposite ends of said roller bar and said shafts, each of said frame members having provided thereon integrally therewith bearing portions for said roller bar and said first-named shaft and a bearing housing for said second shaft whereby to provide an integrated frame for said shafts and said roller bar, a shelf member mounted on said frame members, an engine mounted on said shelf member directly above said second shaft whereby the mass of said engine is disposed between the said supporting wheels and said roller bar, and transmission means connecting said engine to said second shaft to cause rotation of said cutter blades.

JOSEPH VERDERBER.
RAYMOND H. LISKA.

REFERENCES CITED

The following references are of record in the file of this patent:

UNITED STATES PATENTS

| Number | Name | Date |
|---|---|---|
| 1,039,475 | Auble et al. | Sept. 24, 1912 |
| 1,623,433 | Newton | Apr. 5, 1927 |
| 1,858,618 | Carlson | May 17, 1932 |
| 2,029,498 | Newton | Feb. 4, 1936 |
| 2,253,899 | Duember | Aug. 26, 1941 |